(12) United States Patent
Gottschlich

(10) Patent No.: US 11,694,077 B2
(45) Date of Patent: Jul. 4, 2023

(54) METHODS, SYSTEMS, AND ARTICLES OF MANUFACTURE TO AUTONOMOUSLY SELECT DATA STRUCTURES

(71) Applicant: Intel Corporation, Santa Clara, CA (US)

(72) Inventor: Justin Gottschlich, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 503 days.

(21) Appl. No.: 16/725,911

(22) Filed: Dec. 23, 2019

(65) Prior Publication Data

US 2020/0134458 A1    Apr. 30, 2020

(51) Int. Cl.
| | |
|---|---|
| G06N 3/08 | (2023.01) |
| G06N 5/04 | (2023.01) |
| G06N 20/10 | (2019.01) |
| G06F 17/18 | (2006.01) |
| G06F 18/213 | (2023.01) |
| G06F 18/214 | (2023.01) |
| G06F 18/21 | (2023.01) |

(52) U.S. Cl.
CPC .............. *G06N 3/08* (2013.01); *G06F 17/18* (2013.01); *G06F 18/213* (2023.01); *G06F 18/214* (2023.01); *G06F 18/217* (2023.01); *G06N 5/04* (2013.01); *G06N 20/10* (2019.01)

(58) Field of Classification Search
CPC ............ G06F 17/18; G06F 8/30; G06F 8/427; G06K 9/6232; G06K 9/6256; G06K 9/6262; G06N 20/10; G06N 3/0445; G06N 3/08; G06N 5/04; G06V 10/751
See application file for complete search history.

(56) References Cited

U.S. PATENT DOCUMENTS

| | | | |
|---|---|---|---|
| 2018/0018587 A1* | 1/2018 | Kobayashi | ............... G06N 5/04 |
| 2019/0317844 A1 | 10/2019 | Gottschlich et al. | |
| 2020/0111030 A1* | 4/2020 | Starosta | ................. G06N 20/00 |

OTHER PUBLICATIONS

Li et al., "Machine Learning Based Online Performance Prediction for Runtime Parallelization and Task Scheduling," IEEE Symposium on Performance Analysis of Systems and Software, 2009, 12 pages.

(Continued)

*Primary Examiner* — Ruiping Li
(74) *Attorney, Agent, or Firm* — Hanley, Flight & Zimmerman, LLC

(57) ABSTRACT

Methods, systems, and articles of manufacture to autonomously select data structures are disclosed. An example apparatus includes an ordinal assigner to assign training code operations to respective first ordered values, and assign candidate data structure types to respective second ordered values, a filter generator to, for a first instruction of the training code operations, generate a Bloom filter bit vector pattern based on (a) one of the first ordered values, (b) one of the second ordered values corresponding to a first one of the candidate data structure types, and (c) a size of the first instruction, a label generator to generate a first model training input feature vector based on the Bloom filter bit vector pattern, data corresponding to the first instruction, and a performance metric of the first one of the candidate data structure types, and a neural network manager to train the data structure selection model with the first model training input feature vector.

25 Claims, 8 Drawing Sheets

(56) References Cited

OTHER PUBLICATIONS

Serra et al., "Getting Deep Recommenders Fit: Bloom Embeddings for Sparse Binary Input/Output Networks," RecSys, 2017, 9 pages.
Liu et al., "Self-Supervised Generalisation with Meta Auxiliary Learning," Conference on Neural Information Processing Systems, 2019, 13 pages.
Greff et al., "LSTM: A Search Space Odyssey," IEEE Transactions on Neural Networks and Learning Systems, 2015, 18 pages.
European Patent Office, "Extended European Search Report," mailed in connection with European Patent Application No. 20198484.6, dated Mar. 17, 2021, 11 pages.
Kedmi, "Bloom Filters for the Perplexed," Jul. 29, 2017, 19 pages. Retrieved from https://sagi.io/2017/07/bloom-filters-for-the-perplexed/.
Idreos et al., "Learning Data Structure Alchemy," Bulletin of the IEEE Computer Society Technical Committee on Data Engineering, vol. 42, No. 2, Jun. 2019, pp. 46-57.
Navarro, "Compact Data Structures: A Practical Approach," 2016, Cambridge University Press, New York, NY.
Kraska et al., "The Case for Learned Index Structures," Proceedings of the 2018 Conference on Management of Data, Jun. 2018, 16 pages.
Wikipedia, "Database Index," Retrieved Jul. 11, 2019, 6 pages. Retrieved from https://en.wikipedia.org/wiki/database_index.
Loncaric et al., "Generalized Data Structure Synthesis," Proceedings of the 40th International Conference on Software Engineering, May-Jun. 2018, 11 pages.
Feser et al., "Synthesizing Data Structure Transformations from Input-Output Examples," Proceedings of the 36th ACM SIGPLAN Conference on Programming Language Design and Implementation, Jun. 2015, 11 pages.
Graefe et al., "B-tree Indexes and CPU Caches," IEEE 17th International Conference on Data Engineering, Feb. 2001, 10 pages.
Richter et al., "A Seven-Dimensional Analysis of Hashing Methods and its Implications on Query Processing," VLDB Endowment, vol. 9, No. 3, 2015, 12 pages.
Brownlee, "Supervised and Unsupervised Machine Learning Algorithms," Machine Learning Mastery, Mar. 16, 2016, 4 pages. Retrieved from https://machinelearningmastery.com/supervised-and-unsupervised-machine-learning-algorithms/.
European Patent Office, "Communication Under Rule 71(3) EPC," mailed in connection with European Patent Application No. 20198484. 6, dated Mar. 21, 2022, 119 pages.

\* cited by examiner

METHODS, SYSTEMS, AND ARTICLES OF MANUFACTURE TO AUTONOMOUSLY SELECT DATA STRUCTURES

FIELD OF THE DISCLOSURE

This disclosure relates generally to code development, and, more particularly, to methods, systems, and articles of manufacture to autonomously select data structures.

BACKGROUND

Applications executing on a platform, such as a personal computer (PC), server, tablet, etc. utilize particular data structures to facilitate data transfer and/or manipulation. In some examples, a data structure is a software repository (sometimes referred to as a "container") in which data can be inserted, from which data can be removed and/or from which data can be accessed. Software programmers use data structures in code development (e.g., programming) efforts, such as code development in C++. There are many types of data structures, such as arrays, vectors, linked lists, binary trees and hash maps.

BRIEF DESCRIPTION OF THE DRAWINGS

The figures are not to scale. In general, the same reference numbers will be used throughout the drawing(s) and accompanying written description to refer to the same or like parts.

Figure 1:
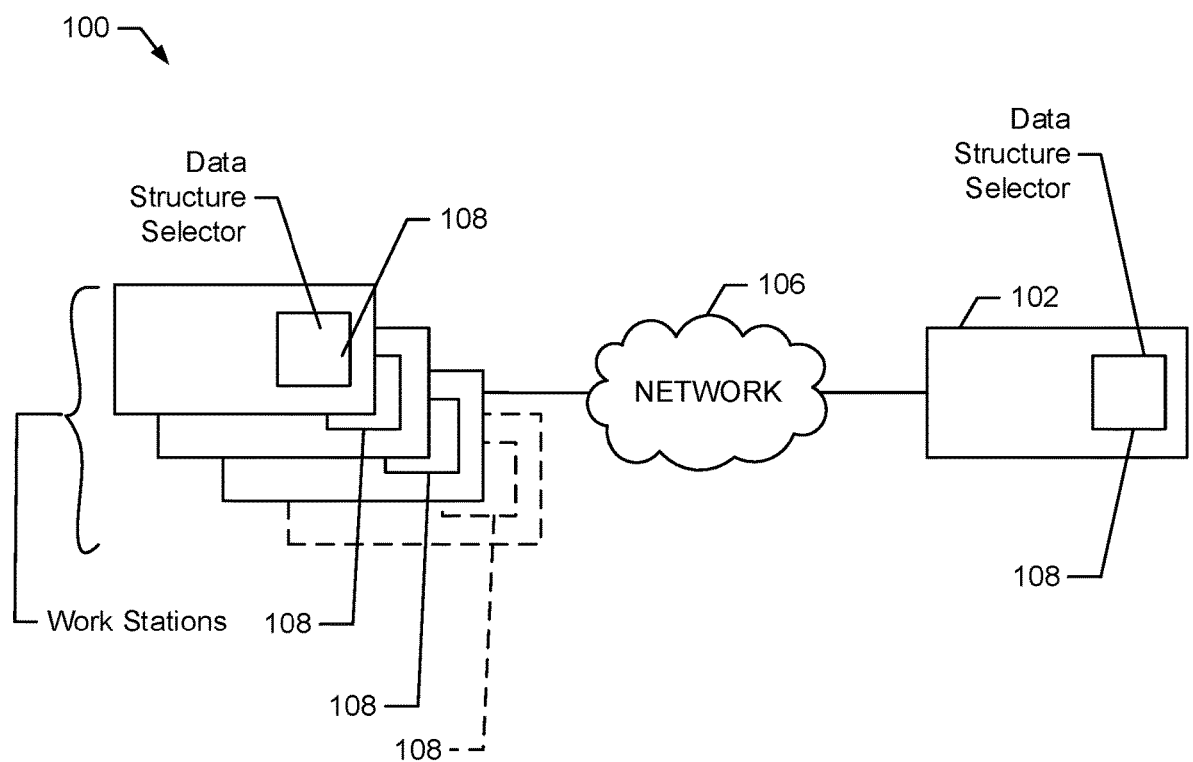
FIG. 1 is a schematic illustration of an example data structure selection system constructed in accordance with teachings of this disclosure to select data structures.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In some examples, a long short-term memory (LSTM) model is used. Using an LSTM model enables series-type data to be considered in a manner that allows temporal context revelations. In general, implementing a ML system involves two phases, a learning/training phase and an inference phase. In the learning/training phase, a training algorithm is used to train a model to operate in accordance with patterns and/or associations based on, for example, training data. However, examples disclosed herein expand upon traditional approaches of ML and include, in part, techniques to learn how to learn. As described in further detail below, examples disclosed herein include three phases, a first of which involves learning how to learn and includes a manner of labelling data to be used for training purposes. A second phase learns an ML model, and a third phase learns which data structures are a best fit in view of supplied source code.

In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

Once training is complete, a model is deployed for use as an executable construct that processes an input and provides an output based on the network of nodes and connections defined in the model. The model is stored at one or more memory locations or, in some examples, in one or more network-accessible location(s) (e.g., cloud-based storage). The model may then be executed by the local agent.

The deployed model may operate in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training dataset, hyperparameters, etc., to generate an updated, deployed model.

Utilizing and/or otherwise selecting a particular data structure often affects performance metric(s) of an application executing on a platform. Performance metrics include, but are not limited to, an amount of memory consumed by the data structure, or a speed at which the data structure is capable of transferring (e.g., reading, writing) and/or modifying (e.g., overwriting) data, a number of computer processing unit (CPU) cycles consumed by particular memory operation(s), etc. For instance, performance metrics associated with an amount of memory consumed by the application become important for circumstances in which the application operates on a structure, such as a mobile device platform that has a finite amount of memory. On the other hand, performance metrics associated with a speed at which data can be transferred and/or modified becomes important for circumstances in which the application processes relatively large quantities of data in real-time. In still other examples, an ordered list data structure type enables dataset retrieval to occur in a relatively fast manner, but that data structure type exhibits substantially slower element storage capabilities.

The particular data structures utilized by a given application are typically selected by a code developer during a code development process of the application. As such, the code developer requires detailed knowledge of a relatively large number of different data structure types, a detailed knowledge of syntax implementation of the different data structure types, and a detailed knowledge of which data structure types best improve the performance metrics of interest. In many instances, the selection(s) by the code developer are error-prone and lead to inefficient data structure usage. Such inefficient data structure usage causes, in some cases, program execution duration increases, extra (e.g., wasted) computing resources (e.g., CPU cycles, memory consumption), and/or security vulnerabilities. The traditional computational complexity analysis techniques that programmers use to select a particular data structure typically only include a rough approximation of performance. This complexity analysis (e.g., Big O ( ) notation) does not consider the efficiency impact of computer microarchitecture(s). In other examples, ill-informed or novice code developers employ generalized containers that can potentially perform reasonably well for most applications, but perform sub-optimally for many others.

Additionally, in the event an application uses a particular type of data and/or different data types at different times over the course of its operation, such evolving inputs and/or evolving heterogeneous systems are too numerous for the code development personnel to consider effectively. For instance, an ordered list data type (e.g., data repository) allows relatively fast retrieval of a dataset, but that same data repository type exhibits a relatively slow ability for inserting new elements. In another example, a hash table data type facilitates relatively fast insertion and/or retrieval of particular dataset items, but tasks related to listing an entire dataset in a particular order (e.g., numeric order, alphabetic order, etc.) occur relatively slowly. Still further, in the event a first data structure type is selected at a first time and is observed to exhibit relatively good performance characteristics in connection with a first type of input data, in the event the input data types and/or input data quantities change during use of the application, performance characteristics may adversely change (e.g., degrade). Because data structure selection is a laborious process requiring substantial expertise, numerous design factors, and/or possible dynamic operating conditions, applications written and/or otherwise developed by code development personnel suffer from one or more performance metrics when particular data structures are selected. In other words, relying on the discretion of the code development personnel may result in sub-standard application performance.

Appropriate selection of data structures may improve one or more performance metrics of an application. Examples disclosed herein enable selection of data structure types during code development in a manner that avoids discretionary choices by code developers, and considers an effect on one or more performance metrics. Additionally, examples disclosed herein enable such data structure type selection(s) without a priori knowledge of data type(s) to be implemented with the data structure(s) of the application. Stated differently, during a first time period of application execution a first type of data might be processed with a first demand (e.g., a quantity of data processed per unit of time). However, over time (e.g., as the application ages, becomes more popular, attracts more users), corresponding data input types and/or demands may change during a second time period of application execution. As such, while the initially selected data repository type may have been suitable and/or otherwise appropriate during the first time period, that same data repository type may not have the ability to handle different types of input data and/or different quantities of input data during the second time period. Examples disclosed herein evaluate many different combinations of data container types in connection with heterogeneous systems and evolving application usage, while removing discretionary errors (e.g., code developer assumptions of the best data container type to use) of the code developer such that inexperienced and/or erroneous selection of data structure types can be prevented.

FIG. 1 is a schematic illustration of an example data structure selection system 100. In the illustrated example of FIG. 1, the data structure selection system 100 includes an example server 102 communicatively connected to an example network 106. The example server 102 includes an example data structure selector 108 to facilitate selection of data structures (e.g., data structure types), as described in further detail below. In some examples, the example data structure selector 108 of the example server 102 is communicatively connected to any number of example workstations 110 via the example network 106 (e.g., in circumstances where the respective workstations do not have their own data structure selector 108). In some examples, respective workstations 110 communicatively connect to the example data structure selector 108 during code drafting activities of a user (e.g., a software developer), in which the example data structure selector 108 renders a graphical user interface (GUI) and/or terminal screen for data input/output. However, in some examples the data structure selector 108 may be distributed across (e.g., located within) respective ones of the workstation 110. In some examples, the various data structure selectors 108 operate independently of the other data structure selectors to operate in accordance with the load usage conditions.

Figure 2:
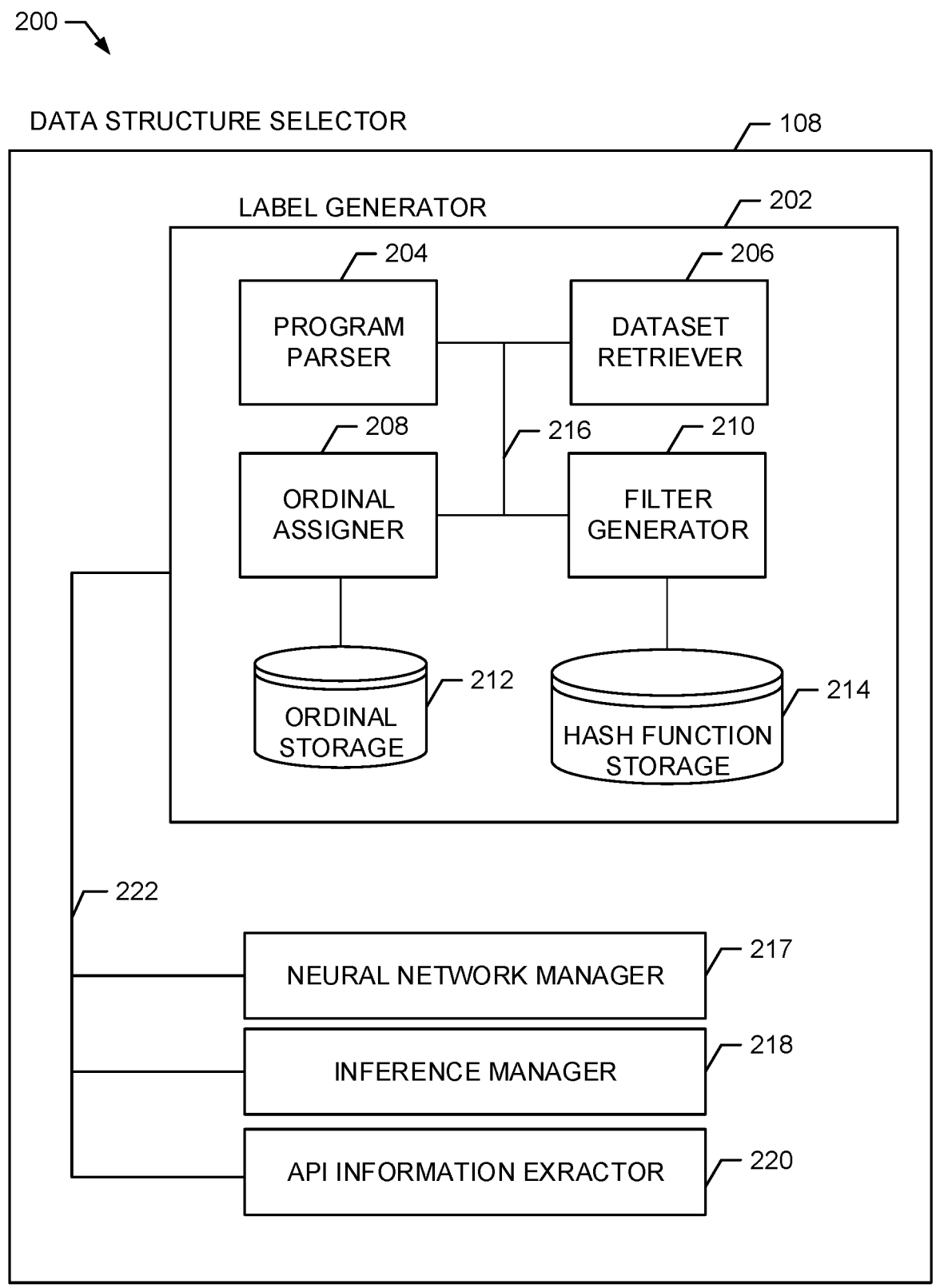
FIG. 2 is a schematic illustration of an example implementation of the data structure selector of FIG. 1.

FIG. 2 illustrates an example implementation of the example data structure selector 108 of FIG. 1. In the illustrated example of FIG. 2, the data structure selector 108 includes an example label generator 202. The example label generator 202 includes an example program parser 204, an example dataset retriever 206, an example ordinal assigner 208, and an example filter generator 210. The example ordinal assigner 208 is communicatively connected to an example ordinal storage 212, and the example filter generator 210 is communicatively connected to an example hash function storage 214. The example label generator 202 includes an example first bus 216 to facilitate communication and/or control between the aforementioned structure therein.

The example data structure selector 108 also includes an example neural network manager 217, an example interface manager 218, and an example application programming interface (API) information extractor 220. The example data structure selector 108 includes an example second bus 222 to facilitate communication and/or control between any structure within the data structure selector 108, including structure within the example label generator 202.

In operation, the example data structure selector 108 and/or the example data structure selection system 100 facilitates three phases to identify the best data structure type(s) for a given program. As described in further detail below, during an example first phase, the label generator 202 learns how to learn by labelling data. Additionally, during an example second phase, the example neural network manager 217 learns one or more machine learning (ML) models (sometimes referred to as a data structure selection model) constructed from the data generated in the example first phase. During phase three (the final phase), the example inference manager 218 learns which data structures are a best fit (e.g., most time-efficient) for program input(s) applied to the model(s) from example phase two.

Examples disclosed herein address at least one of the core problems in determining which data structures are a best fit based on corresponding performance cost(s) exhibited by different data structures when they are executed. Because different data structures can be implemented and thereafter executed in a particular program, a context of that program is also a relevant consideration when selecting the "best fit" data structure. Traditional approaches are confronted with an infeasible task because executing a large volume of (e.g., every possible) data structure(s) during training execution for a large sample of data is computationally prohibitive. In some examples, the computational overhead grows exponentially based on a type of action being performed on a candidate data structure type. Examples disclosed herein mitigate this exponential overhead.

During the example first phase, the example dataset retriever 206 retrieves a statistically distributed dataset (e.g., training code). The example dataset contains any number of subprograms used to populate, access and/or unpopulated candidate data structures. However, the example dataset is also structured to prevent an excessive computational burden on computing systems during training of a machine learning cost model. Generally speaking, traditional approaches to training a cost model include using real-world source code that, in some cases, may be labeled in different ways. Real-world source code, however, may introduce substantial computational complexity and/or substantial data bandwidth requirements that inundate computational training resources. Execution of real-world code may be either intractable or impossible. For instance, performing an iterative "find" instruction on a linked list having one trillion items therein will complete, but not within a human lifespan. Alternatively, performing an "insert" operation on a dynamic vector having one trillion items cannot successfully complete due to existing hardware limitations in contiguous main memory (e.g., random access memory (RAM)). In other words, a mere brute-force approach at training is time consuming and wasteful of computational resources.

Instead, examples disclosed herein employ subprograms that exhibit a statistical variability to accommodate different program execution contexts. For instance, some of the subprograms include data structure operations associated with high-volume throughput, such as image processing tasks with homogeneous data types, while some of the subprograms include data structure operations associated with relatively lower-volume throughput and heterogeneous data types. In some examples, the quantity of subprograms applied during the first phase is heuristically determined.

A program, which may have any number of subprograms, typically includes data structure application programming interface (API) calls as placeholders for data structure operations. Stated differently, rather than rely on a code developer to select a particular data structure, one or more requests for data structure operations occur with a data structure API (sometimes referred to herein as "data structure API calls," or "data structure wrappers"). Generally speaking, respective data structure API calls represent a location within a program/code that refers to a data structure operation in an agnostic manner. In other words, corresponding parameters passed to the data structure API identify an operation, and particular data. However, the data structure API does not specify a particular data structure to be used with the operation and corresponding data.

Each example subprogram (e.g., each data structure API) of the dataset includes a quantity of tuples (pairs) having (a) a value (e.g., integer value(s), real number(s), alphanumeric value(s), array(s), etc.) and (b) a data structure API call to perform an operation (e.g., insert, find, remove, etc.). In some examples, the value can be NULL. Example subprograms include "insert 5," "insert 7," "remove 5," etc. For instance, the subprogram "insert 5" indicates a value of five (5) and an "insert" operation into a candidate data structure, but a specific data structure is intentionally not included. Stated differently, while a code developer has a need to insert a value of "5" into some sort of data structure, examples disclosed herein eliminate the possibility of the code developer selecting one or more specific data structures that might not be ideal for the given circumstances or context of the overall program. In some examples, a subprogram may include any number of operations and corresponding values. Typically, an order of the subprograms within a program are immutable to preserve program semantics. In some examples, the subprograms represent real-world execution, but utilize a quantity of data that is manageable for modeling purposes (e.g., data that is not so voluminous that it causes significant computational resources for modeling).

The example ordinal assigner 208 of FIG. 2 assigns ordinal values to operations to be performed on candidate datasets to generate a mathematically ordered reference to the operations. The mathematically ordered reference to the operations is an ordered list of unique ordinal values, respective ones of the ordinal values corresponding to each unique operation. This list of mathematically ordered values is used for training purposes, such as inputs to neural network training models. Additionally, because the ordinals establish a link between example operations (or any other type of parameter) and a unique ordinal value, the example statistically distributed datasets are treated in a consistent manner, even when particular training datasets are used. Similarly, this consistency extends to any real-world code/program(s) that are applied to the machine learning model.

The example ordinal values may be added to a table by the ordinal assigner 208. Table 1 illustrates one of many examples in which operations may be assigned ordinal values.

TABLE 1

| Operation | Ordinal Value (n) |
|---|---|
| insert | 1 |
| remove | 2 |
| find | 3 |
| etc. | n + 1 |

In the illustrated example of Table 1, the ordinal assigner 208 assigns the operation "insert" to ordinal value "1," assigns operation "remove" to ordinal value "2," and so on for any number of possible operations to be performed on a candidate data structure. Operation types and their associated assigned ordinal values are stored by the example ordinal assigner 208 in the example ordinal storage 212. As described in further detail below, by assigning operation(s) to a particular ordinal value(s), an input feature map may be generated as a neural network training operation and provide input variability.

In some examples, the ordinal assigner 208 assigns ordinal values to different types of data structures to be used during training and inference operations. For instance, the ordinal assigner 208 may assign ordinal values to data structures in a table, like Table 2 below.

TABLE 2

| Data Structure Type | Ordinal Value (k) |
|---|---|
| balanced binary tree | 1 |
| red-black tree | 2 |
| ordered vector | 3 |
| ordered linked list | 4 |
| etc. | k + 1 |

In the illustrated example of Table 2, the ordinal assigner 208 assigns the data structure type "balanced binary tree" to ordinal value "1," assigns the data structure type "red-black tree" to ordinal value "2," and so on for any number of candidate data structure types to be analyzed. Data structure types and their associated assigned ordinal values are stored by the example ordinal assigner 208 in the example ordinal storage 212. As described in further detail below, by assigning data structure type(s) to respective ordinal value(s), an input feature map may be generated as a neural network training operation and provide input variability.

Continuing with phase one, the example program parser 204 selects a data structure API in the statistically distributed dataset. The example filter generator 210 allocates a Bloom filter. Generally speaking, when training a neural network, a relatively large amount of variability of the input feature vector enables neural network models that exhibit relatively greater accuracy and faster convergence. As such, examples disclosed herein integrate one or more bit vectors of the Bloom filter to further introduce variability of the input feature vector(s). A Bloom filter is a probabilistic data structure that represents inputs (e.g., inputs as a set S containing features, such as $X_1$, $X_2$, $X_3$, etc.) as a bit vector having a particular allocated size (k). Values associated with corresponding ones of the features of the example set S are inputs to one or more hash functions. In some examples, one hash function is used for all features of the example set S. In other examples a separate hash function is used for each feature to increase a probabilistic degree of variability in which particular bits of the bit vector are set. In some examples, a first hash function is used as an input to generate a Bloom filter bit vector based on a particular threshold value of an operand and/or instruction of an operation. In other words, if the instruction satisfies a first threshold metric (e.g., an integer value less than one million), then a first hash function is selected by the filter generator 210. On the other hand, if the instruction satisfies a second threshold metric (e.g., a real number greater than one million), then a second hash function is selected by the filter generator 210.

After the bit vector of the Bloom filter is set, a query may be performed on the Bloom filter (e.g., a query of the bit vector of the Bloom filter) to determine whether the query input is a member of the set S. Bloom filters are zero-false-negative data structures such that if an input query to the Bloom filter does not have a corresponding matching bit value(s), then the contents of that query are guaranteed not to be present. On the other hand, in the event the query to the Bloom filter generates one or more bit vector positions that match, then the content of that query may or may not be present. This is true because, in part, the hash functions used to generate the bit vector when "building" the Bloom filter may produce an output bit representation that overlaps with one or more other (e.g., additional) hash functions. This is why a relatively smaller Bloom filter bit size results in a relatively greater probability of uncertainty as compared to relatively larger Bloom filter bit sizes where hash function overlap is less likely to occur.

As described above, the Bloom filter bit vector size (k) can be allocated based on, for example, design constraints and/or computational capabilities of the example data structure selection system 100. A general first order approximation size for the Bloom filter bit vector size (k) is between 4,000 bits and one million bits, but examples disclosed herein are not limited thereto. For example, the example relatively lower Bloom filter size of 4,000 requires fewer computational resources, but increases the possibility that bit overlap may occur, sometimes referred to as Bloom filter interference or Bloom filter saturation. On the other hand, a relatively large Bloom filter size (e.g., one million bits) reduces the negative effects of Bloom filter saturation, but increases neural network training and inference time due to the additional computational overhead required.

After the example filter generator 210 allocates a Bloom filter size, the example program parser 204 selects a candidate data structure type. Generally speaking, examples disclosed herein apply the statistically distributed dataset to the candidate data structure types of interest (e.g., all types) and measures one or more corresponding performance metrics (e.g., a time to execute). As used herein, "statistically distributed" refers to one or more datasets in which corresponding data includes a heterogenous mixture of different data structures, a heterogenous mixture of different data values (e.g., integers, real numbers, text characters, arrays, Boolean values, etc.) operated-on by the different data structures, and/or a heterogenous mixture of quantities of respective types of data structures and data values. Any type of statistical distribution may be used to generate the variety, such as a random sample or a selection based on threshold percentages (e.g., 20% of the data values are integers, 20% of the data values are real, 15% of the data structures are binary trees, 25% of the data structures are ordered linked lists, etc.). However, because the statistically distributed dataset is selected as a relatively manageable size (e.g., a size proportionate to a size of underlying memory resources of a platform on which examples disclosed herein operate), the repeated operations on each candidate data structure do not cause an unreasonable computational burden on the example data structure selection system 100. In view of a selected data structure type (e.g., a first selected data structure type (e.g., a balanced binary tree) for a first iteration of the data structure API), the filter generator 210 generates or, in circumstances where a Bloom filter has already been created, updates the Bloom filter (e.g., generates/updates the bit vector) based on information associated with (a) the selected data structure API (e.g., the operation and the value, such as "insert 5") and (b) the candidate data structure to be tested (e.g., a balanced binary tree).

The filter generator 210 determines whether a specific hash or combination of hashes is to be used based on the selected data structure type. If a specific hash function is to be used, the filter generator 210 queries the example hash function storage 214 for a hash function associated with the selected data structure, otherwise a default hash function or default combination of hash functions is used. The example filter generator 210 applies features associated with the data structure API to the selected hash function to generate a hash output, which is represented as one or more bit values of the Bloom filter bit vector. For example, the data structure API features may include an operation of "insert" and a data structure type of "balanced binary tree." Referring back to example Table 1 and Table 2, the operation "insert" corresponds to ordinal value "1" and the data structure type of "balanced binary tree" corresponds to ordinal value "1." These ordinal values are applied as inputs to the selected hash function(s) to cause a corresponding output value to be used to set bits of the Bloom filter bit vector.

The data structure API is deemed to have a corresponding size based on the number of operations associated with it. For instance, a first data structure API with a subprogram "insert 5" (e.g., "insert X" where "X" is a first data type of interest) has a corresponding size of one because the candidate data structure to which the operation was applied grows by one value. For the sake of illustration, assume that the bit vector, as modified by the "insert 5" operation results in a ten-bit pattern of 0010110000. In the event a second data structure API with a first subprogram "insert 5" and a second subprogram "insert 7" (e.g., "insert Y" where "Y" is a second data type of interest) occurs, then the candidate data structure has a corresponding size of two because two separate operations have occurred on the data structure in an effort to add data. In this example, the first subprogram of the second data structure API causes a corresponding first addition of bits being set to the Bloom filter bit vector (e.g., the ten bit pattern 0010110000 shown above) and the second subprogram of the second data structure API causes a corresponding second addition of bits being set to the Bloom filter bit vector as 0010110011 (e.g., note that only the last two bits have changed from zero to one). Such a modification clearly allows these two different data structure APIs to be distinguished from each other based on an analysis of the bit vector alone.

However, assume a third data structure API includes the operations (a) "insert 5" (b) "insert 7" and (c) "remove 7". While the operations (a) and (b) each involve a modification of the bit vector, one characteristic of the Bloom filter is that it is a data structure that does not permit the removal of bits after they have been set. In other words, the operation "remove 7" has no effect on the Bloom filter bit vector. As a result, the bit vector of the third data structure API and the second data structure API will be the same. When training a neural network, having an input training vector that is the same for two separate circumstances causes error and poor training convergence. To avoid such circumstances, the data structure API size is also used with the bit vector as another element of distinction. For instance, while the bit vector of the third data structure API is 0010110011 and the bit vector of the second data structure API is the same, the data structure API size of one for the third data structure API differs from the data structure API size of two for the second data structure API, thereby allowing these two data structure APIs to be properly distinguished when training and/or inferencing.

The example program parser 204 executes the selected data structure API and the example label generator 202 records and/or otherwise logs an associated execution time of the data structure API in view of that particular selected data structure. The performance information, associated bit vector value, data structure type, operation and size operate as a labeled data item to be used for neural network training and inference purposes. This is repeated for the other candidate data structure types (e.g., all candidate types) so that a corresponding execution time (or other performance metric of interest) can be determined for the data structure API instance on a data structure by data structure basis, thereby generating training data. When evaluation of the candidate data structures to be considered for the selected data structure API is complete, the example program parser 204 searches the program for one or more additional subprograms (data structure APIs) to evaluate in a similar manner to generate more training data (e.g., which includes performance metric data). Stated differently, the result of the aforementioned phase one operations results in labels indicative of execution times for different types of data structures and an input feature vector having data structure type information, Bloom filter bit vector information, and data structure size information. This information is used in phase two, as described in further detail below.

Phase two generates a cost model to be used for inferencing in phase three. While the example statistically distributed dataset was used in phase one to generate a labeled dataset, the same statistically distributed dataset is used again to train a neural network in phase two. The example program parser 204 retrieves the statistically distributed dataset (e.g., the program having any number of subprograms (data structure API calls) and selects one of the data structure APIs therein. The example program parser 204 selects a candidate data structure for training, and the neural network manager 217 generates a neural network input feature vector based on the data generated in phase one. Stated differently, the neural network manager 217 takes as an input the data structure API call, the value(s) for the selected data structure API, the selected candidate data structure type, and the Bloom filter bit vector. Additionally, the NN input feature vector includes corresponding performance metrics (e.g., execution time values) and container size information. Based on these inputs, the example neural network manager 217 trains the neural network. In some examples, training includes iteratively retrieving input feature vector data for each data structure of interest, as well as for each data structure API of interest in the example statistically distributed dataset.

After a neural network model is learned (e.g., generated, trained) in phase two, the model may be applied to real-world programs in phase three. As disclosed above, code developers generate code and/or pseudo code having data structure API function calls as placeholders for specific data structures. As such, the code developers apply the data structure API function call in a data structure agnostic manner. In other words, the code developers do not need to be concerned with proper data structure initialization nuances, syntax, etc. More generally, such developers do not have the opportunity to select a data structure that may not be an ideal fit for the overall program context and/or objectives. Instead, examples disclosed herein verify a cost estimate for candidate data structures to be used with the particular data structure API based on a relatively lowest execution time.

In phase three, the example program parser 204 retrieves a program and begins executing that program. The example program parser 204 inspects the instructions of the program and determines whether those instructions include a data structure API function call indicative of automatic data structure type selection. If the instruction is not such a data structure API function call, then program execution may proceed in a normal and/or otherwise traditional manner, and the next instruction is inspected.

In the event the example program parser 204 identifies an instruction that includes a placeholder data structure API, the example API information extractor 220 extracts available information from the data structure API. Information associated with the data structure API includes the operation (e.g., "insert"), the value associated with the operation (e.g., "5"), and a size of the data structure. However, because phase three operates with real world code, a corresponding Bloom filter does not exist. Instead, the example filter generator 210 applies the data structure API information as an input to generate Bloom filter bit vector values for each data structure of interest to be emulated using the model. The example inference manager 218 applies this information as an input to the model created in phase two in a data structure-by-data structure manner to generate a predicted computational cost estimate. Corresponding computational cost estimate value(s) (e.g., execution durations) are logged for each data structure, and a data structure with a relatively best performing (e.g., lowest relative execution time) metric is selected for a given operation(s) of the selected data structure API.

The example program parser 204 executes a special data structure instruction to update the (newly) identified best bit data structure, and updates the previously created Bloom filter bit vector in view of the winning selection. The program parser 204 executes the data structure API function call to maintain proper program semantics (e.g., using a binary tree). If the program has additional instructions to analyze/emulate in view of the model from phase two, the aforementioned process of phase three repeats to obtain another predicted computational cost estimate. Again, these are aggregated to identify a computational cost of the program without a need to actually execute the program with voluminous real data. Instead, the program is emulated with the model and the cost estimate is derived for the particular combination of data structures that reveal a lowest relative execution duration (or other performance metric).

While an example manner of implementing the data structure selector 108 of FIG. 2 is illustrated in FIGS. 1-2, one or more of the elements, processes and/or devices illustrated in FIGS. 1-2 may be combined, divided, re-arranged, omitted, eliminated and/or implemented in any other way. Further, the example label generator 202, the example program parser 204, the example dataset retriever 206, the example ordinal assigner 208, the example filter generator 210, the example ordinal storage 212, the example hash function storage 214, the example neural network manager 217, the example inference manager 218, the example API information extractor 220 and/or, more generally, the example data structure selector 108 of FIGS. 1-2 may be implemented by hardware, software, firmware and/or any combination of hardware, software and/or firmware. Thus, for example, any of the example label generator 202, the example program parser 204, the example dataset retriever 206, the example ordinal assigner 208, the example filter generator 210, the example ordinal storage 212, the example hash function storage 214, the example neural network manager 217, the example inference manager 218, the example API information extractor 220 and/or, more generally, the example data structure selector 108 of FIGS. 1-2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example label generator 202, the example program parser 204, the example dataset retriever 206, the example ordinal assigner 208, the example filter generator 210, the example ordinal storage 212, the example hash function storage 214, the example neural network manager 217, the example inference manager 218, the example API information extractor 220 and/or, more generally, the example data structure selector 108 of FIGS. 1-2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example data structure selector 108 of FIGS. 1-2 may include one or more elements, processes and/or devices in addition to, or instead of, those illustrated in FIGS. 1-2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

In examples disclosed herein, means for generating labels (sometimes referred to herein as a label generating means) may be implemented by the label generator 202. In examples disclosed herein, means for program parsing (sometimes referred to herein as a program parsing means) may be implemented by the program parser 204. In examples disclosed herein, means for retrieving datasets (sometimes referred to herein as a dataset retrieving means) may be implemented by the dataset retriever 206. In examples disclosed herein, the means for assigning ordinals (sometimes referred to herein as an ordinal assigning means) may be implemented by the ordinal assigner 208. In examples disclosed herein, the means for filter generating (sometimes referred to herein as a filter generating means) may be implemented by the filter generator 210. In examples disclosed herein, means for managing neural networks (sometimes referred to herein as a neural network managing means) may be implemented by the neural network manager 217. In examples disclosed herein, means for managing inferences (sometimes referred to herein as an inference managing means) may be implemented by the inference manager 218. In example disclosed herein, means for API information extracting (sometimes referred to herein as an API information extracting means) may be implemented by the API information extractor 220.

Flowcharts representative of example hardware logic, machine readable instructions, hardware implemented state machines, and/or any combination thereof for implementing the data structure selector 108 of FIGS. 1-2 are shown in FIGS. 3-7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3-7, many other methods of implementing the example data structure selector 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 3-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 3:
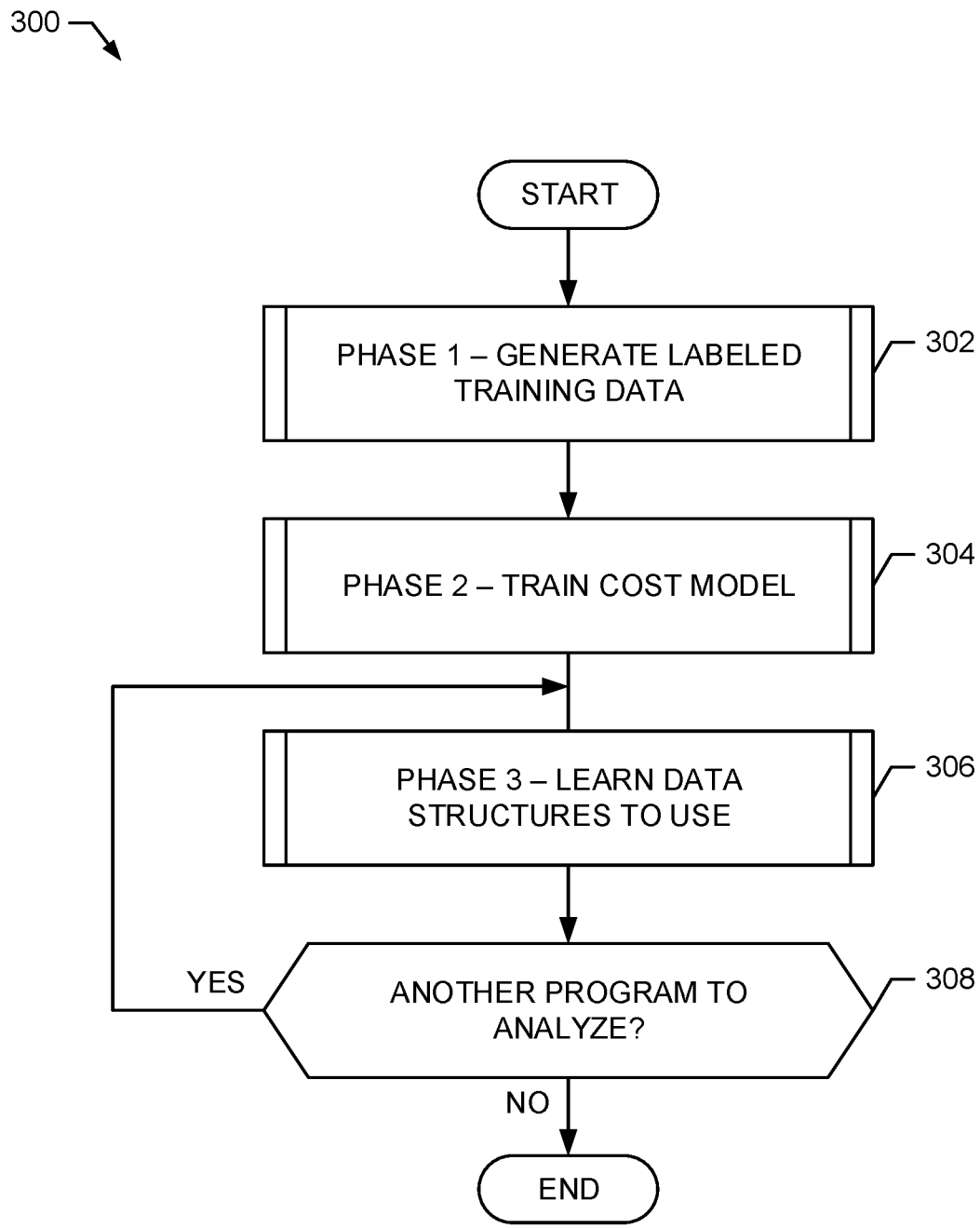
FIGS. 3-7 are flowcharts representative of example machine readable instructions that may be executed to implement the example system of FIG. 1 and/or the example data structure selector of FIGS. 1 and/or 2 to select data structures.

The program 300 of FIG. 3 includes block 302, where the example label generator 202 initiates generation of labeled training data. In response to generating the labeled training data, the example neural network manager 217 trains a cost model (block 304). The example inference manager 218 learns data structures to use based on input of a real world program (block 306). Additionally, in the event of one or more additional real world programs of interest, the example program parser 204 identifies such programs and applies them to the model generated in phase two (block 308).

Figure 4:
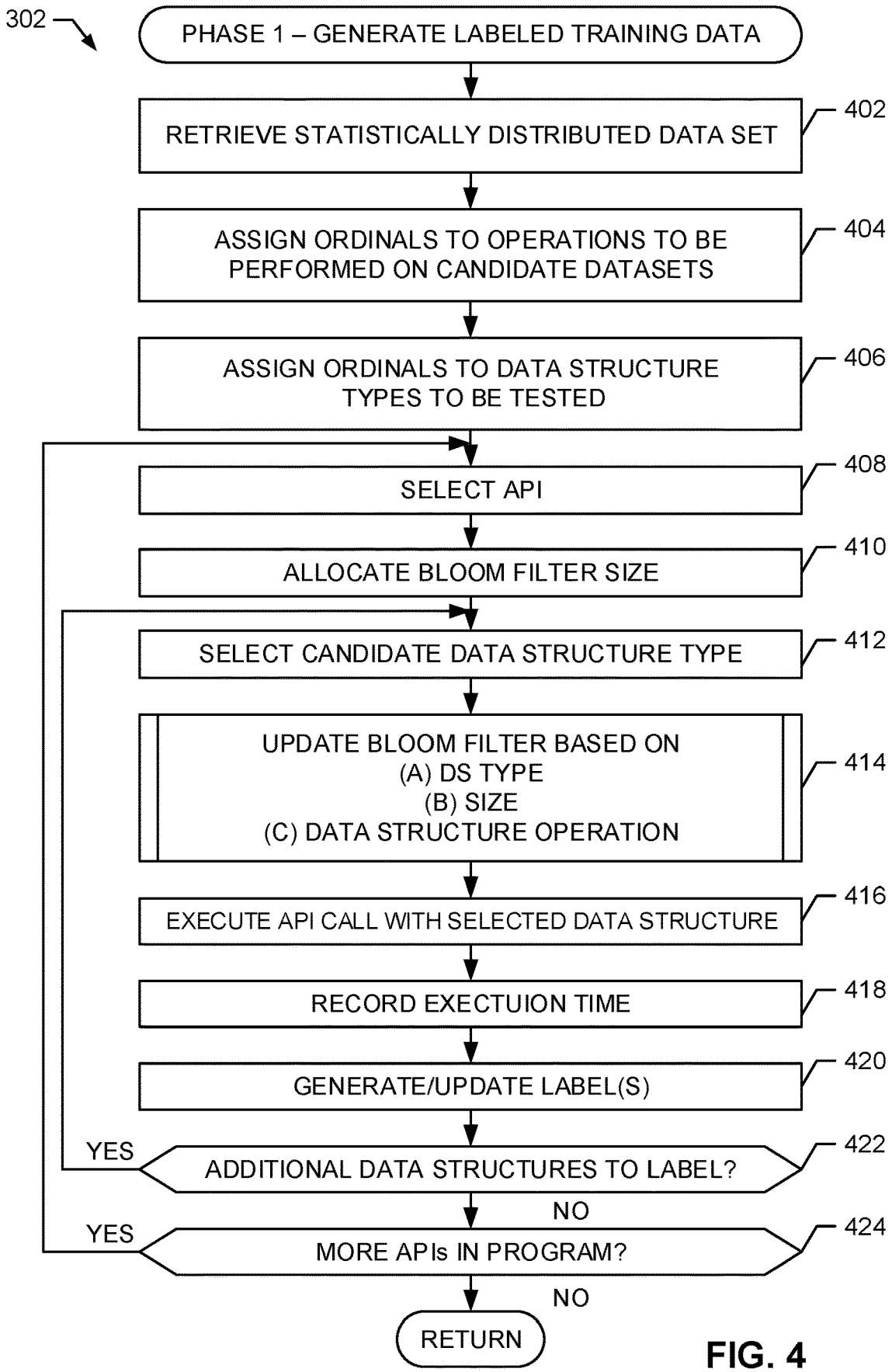

Program 302 of FIG. 4 illustrates additional detail associated with generating labelled data of phase one. In the illustrated example of FIG. 4, the example dataset retriever 206 retrieves a statistically distributed dataset (block 402), and the example ordinal assigner 208 assigns ordinal values to operations to be performed on data structures (block 404) and assigns ordinal values to data structure types to be tested (block 406). Associations between operations and their corresponding ordinal assignments and associations between data structures and their corresponding ordinal values are stored in the example ordinal storage 212.

Figure 5:
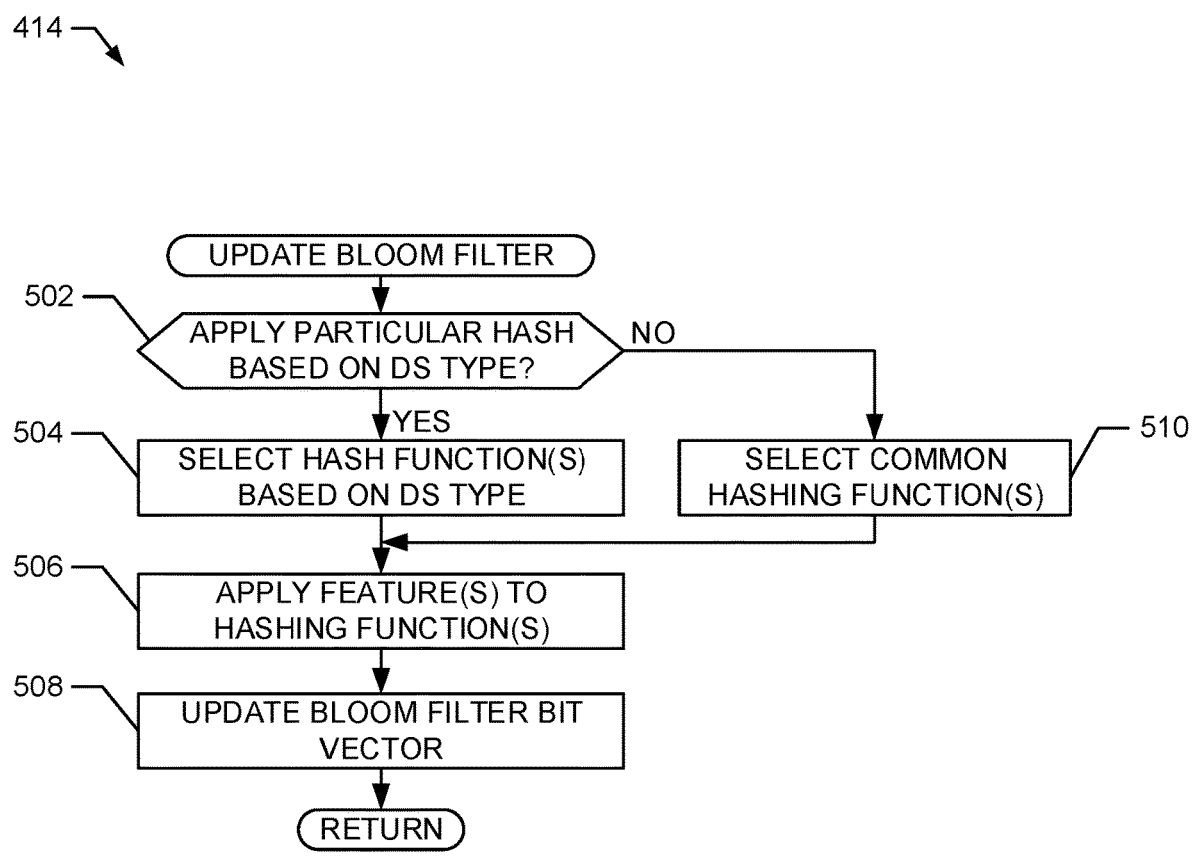

The example program parser 204 selects a data structure API of the source program (e.g., the statistically distributed dataset) (block 408), and the example filter generator 210 allocates a Bloom filter size (block 410). The example program parser 204 selects a candidate data structure type (block 412) and the example filter generator updates the Bloom filter (e.g., updates a bit vector of the Bloom filter) based on a selected data structure type, a data structure size, and a particular data structure operation (block 414). Additional details regarding updating the bit vector of the Bloom filter (block 414) are illustrated in FIG. 5. Turning briefly to the illustrated example of FIG. 5, the example filter generator 210 determines whether a particular and/or otherwise specific hash function is to be used based on a selected data structure type (block 502). If not, then the filter generator 210 selects a common and/or otherwise default hashing function from the example hash function storage 214 (block 510). However, if a particular hash function is to be used based on a selected type of data structure (block 502), then the filter generator 210 selects a specific one or more of the hash function(s) stored in the example hash function storage (block 504). In either circumstance, the filter generator 210 applies input features to the hash function(s) (block 506) and updates the bit vector of the Bloom filter (block 508). Control then returns to FIG. 4 with an updated bit vector representation of the current data structure API of interest and its associated unique features.

Returning to FIG. 4, the example program parser 204 executes the operation(s) of the data structure API call using the data from the statistically distributed dataset (block 416). The example label generator 202 determines and records an execution time for the operation on its corresponding value using the selected data structure (block 418) and generates and/or otherwise updates labels associated with the data structure API to be used as training inputs in phase two (block 420). The example program parser 204 determines whether there are one or more additional data structures to test/evaluate (block 422) and, if so, control returns to block 412. Otherwise the example program parser 204 determines whether there are one or more additional data structure APIs to test/evaluate (block 424) and, if so, control returns to block 408. The program 302 of FIG. 4 then returns to block 304 of FIG. 3.

Figure 6:
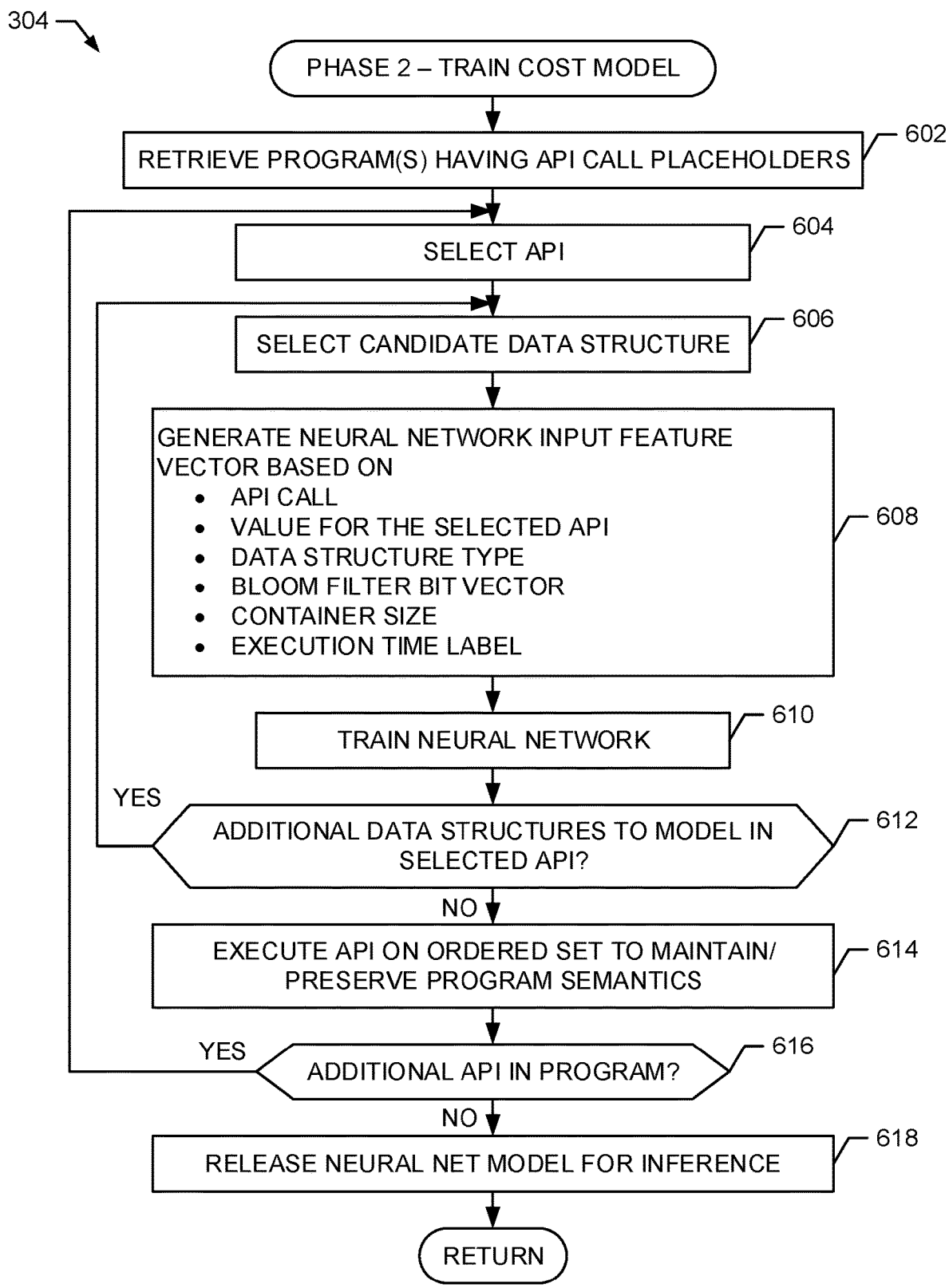

Program 304 of FIG. 6 illustrates additional detail associated with training a cost model of phase two. In the illustrated example of FIG. 6, the example program parser 204 retrieves the same program used in phase one, which includes any number of data structure API calls (block 602). The program parser 204 selects one of those data structure APIs (block 604) and selects a candidate data structure (block 606). The example neural network manager 217 generates a neural network input feature vector for training purposes (block 608). In some examples, the neural network manager 217 generates the input feature vector based on the data structure API call, a value for the selected data structure API call, the selected data structure type, the Bloom filter bit vector (calculated from phase one), the container size, and the execution time (block 608). The example neural network manager 217 trains the neural network based on the current iteration of inputs from the input feature vector (block 610), and the example program parser 204 determines whether there are additional data structures to model in the selected data structure API (block 612). If so, then control returns to block 606, otherwise the example program parser 204 executes the data structure API on an ordered set to maintain or otherwise preserve proper program semantics (block 614). The example program parser 204 determines whether there are additional data structure APIs in the program (block 616) and, if so, control returns to block 604 to select another data structure API for further model development. Otherwise, the neural network manager 217 releases the iteratively developed neural network model to be used for inferencing (block 618). Control then returns to block 306 of FIG. 3.

Figure 7:
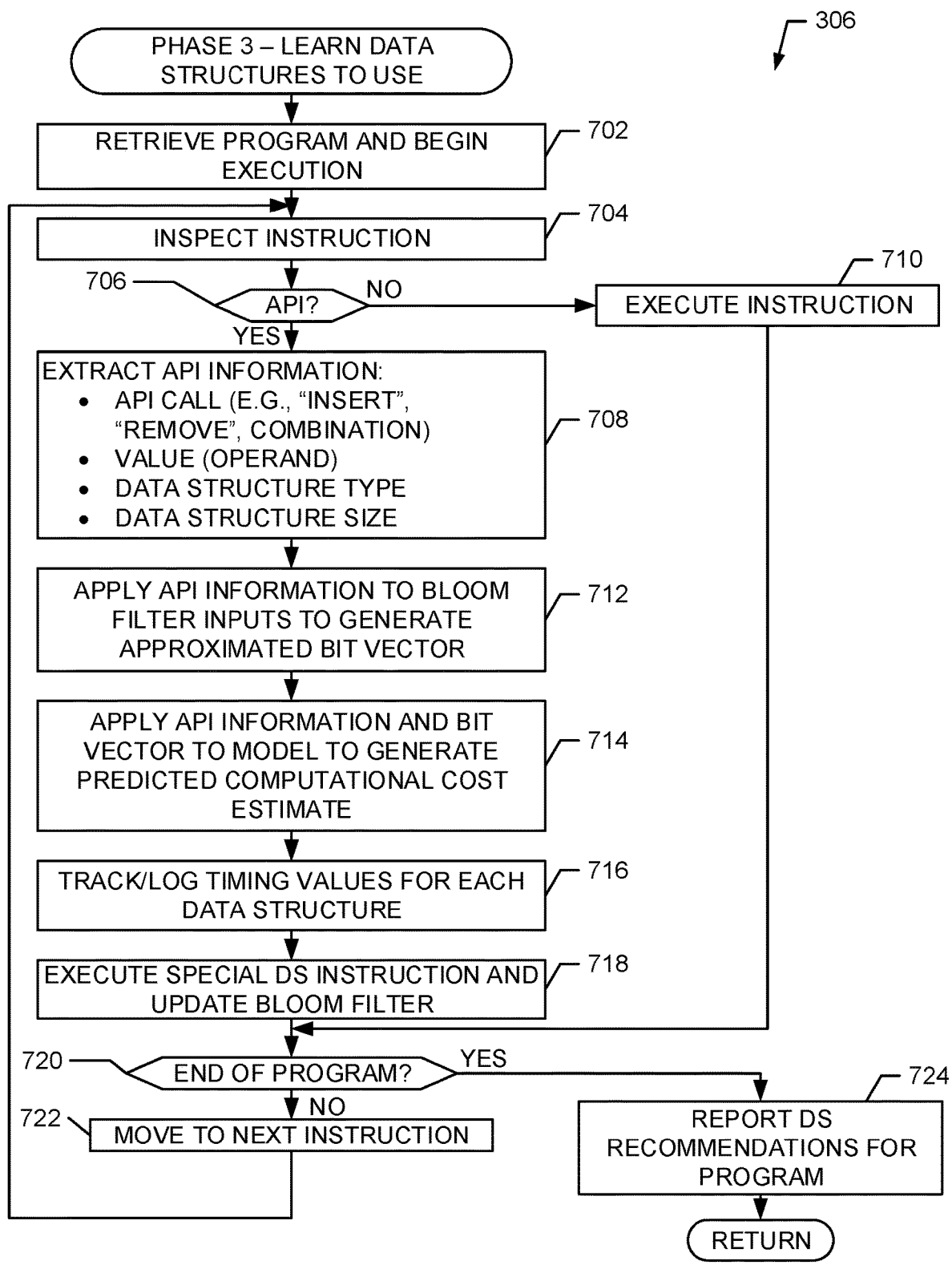

Program 306 of FIG. 7 illustrates additional detail associated with learning which data structures to use via inferencing with the model (phase three). In the illustrated example of FIG. 7, the example program parser 204 retrieves a program and begins executing that program (block 702). The example program parser 204 inspects the instructions of the program (block 704) and determines whether those instructions include a data structure API function call indicative of automatic data structure type selection (block 706). If the program parser 204 determines that the instruction is not such a data structure API function call (block 706), then program execution may proceed in a normal and/or otherwise traditional manner (block 710). If the example program parser 204 determines that the program has not ended (block 720), then it moves to a next instruction (block 722).

However, in response to the example program parser 204 determining that the instruction of interest is associated with a data structure API placeholder (block 706), the example API information extractor 220 extracts available data structure API information (block 708). As described above, data structure API information includes, but is not limited to the data structure API call (e.g., the operation "insert", the operation "remove," etc.), the value (e.g., the operand), the data structure types to be considered (e.g., ordinal values associated with candidate data structure types that were used in the model), and a data structure size. The example filter generator 210 applies the data structure API information to the example Bloom filter and its corresponding hash function inputs to generate an approximated bit vector (block 712). In particular, the approximated bit vector is also based on one of the candidate data structures to be emulated by the model. As such, any number of bit vectors are generated by the example filter generator 210, each of which is applied by the example inference manager 218 to the model to generate corresponding predicted computational cost estimates for each data structure of interest (block 714). The example inference manager 218 tracks and/or otherwise logs timing values for each data structure of interest and the one having the best performance is retained (block 716). Generally speaking, the operations of block 712, 714 and 716 are iteratively repeated and/or otherwise looped for each data structure of interest for the selected data structure API so that a winning candidate data structure can be selected. The example program parser 204 executes a special data structure instruction using a binary vector for the purpose of maintaining proper program semantics, and the Bloom filter bit vector is updated based on the winning data structure (block 718). If the example program parser 204 determines that the program has ended (block 720) (e.g., no further instructions are left unevaluated), then the neural network manager 217 reports the one or more data structure recommendations for the program (block 724). Control then returns to block 308 of FIG. 3.

Figure 8:
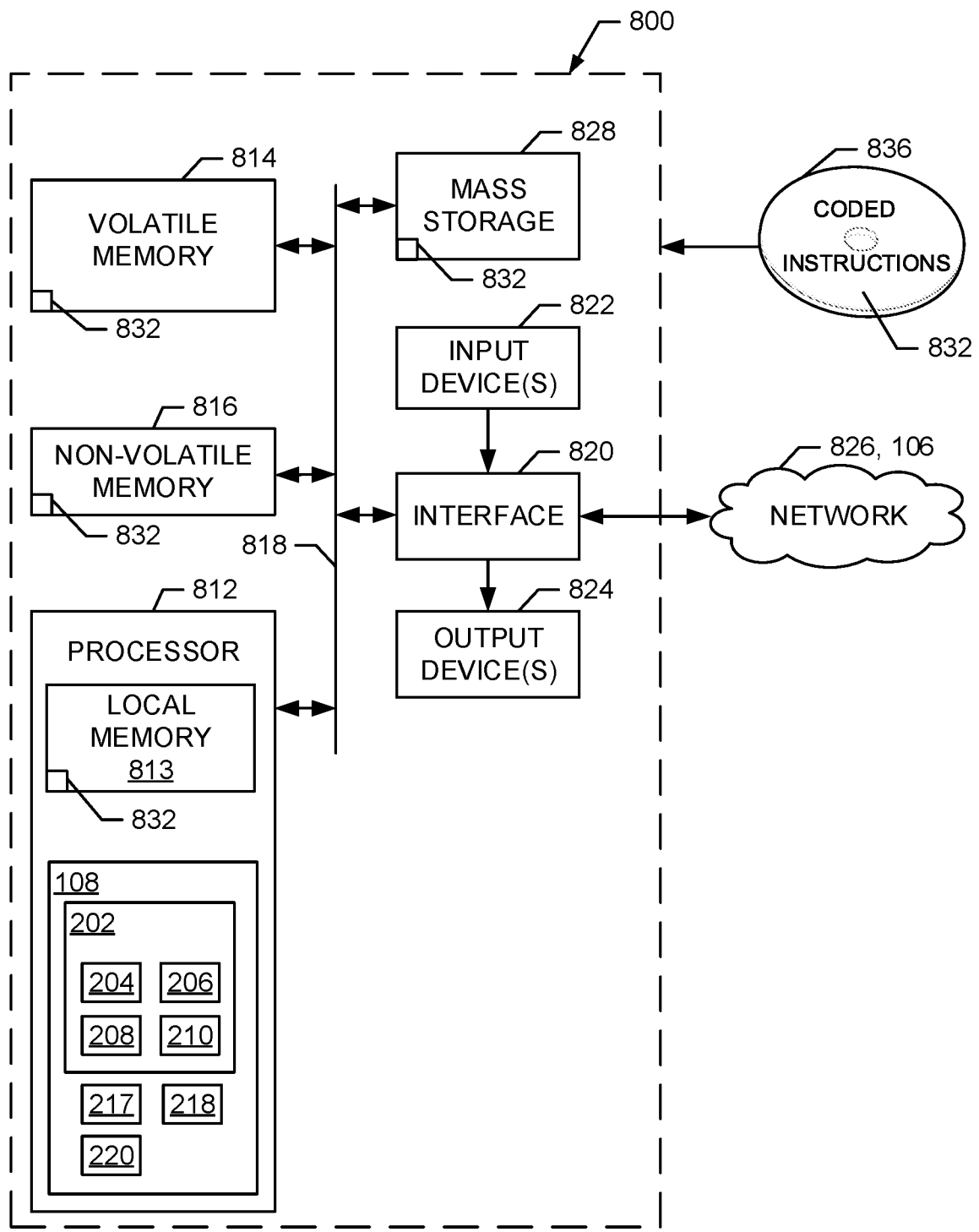
FIG. 8 is a block diagram of an example processor platform structured to execute the instructions of FIGS. 3-7 to implement the example data structure selection system of FIG. 1 and/or the example data structure selector of FIGS. 1 and/or 2.

FIG. 8 is a block diagram of an example processor platform 800 structured to execute the instructions of FIGS. 3-7 to implement the data structure selector 108 of FIGS. 1 and 2. For example, the label generator 202, the program parser 204, the dataset retriever 206, the ordinal assigner 208, the filter generator 210, the neural network manager 217, the inference manager 218 and the API information extractor 220 can implement the processor platform 800. The processor platform 800 can be, for example, a server, a personal computer, a workstation, a self-learning machine (e.g., a neural network), a mobile device (e.g., a cell phone, a smart phone, a tablet such as an iPad™), an Internet appliance, a gaming console, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data structure selector 108, which includes the example label generator 202, the example program parser 204, the example dataset retriever 206, the example ordinal assigner 208, the example filter generator 210, the example neural network manager 217, the example inference manager 218 and the example API information extractor 220.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3-7 may be stored in the mass storage device 828, in the volatile memory 814, in the non-volatile memory 816, and/or on a removable non-transitory computer readable storage medium 836 such as a CD or DVD.

From the foregoing, it will be appreciated that example methods, apparatus and articles of manufacture have been disclosed that avoid discretionary errors and/or selections by code developers when deciding which types of data structures to use during code development efforts. Examples disclosed herein relieve the code developers from the burden of not only selecting a particular data structure type, but also relieve the code developers from needing to understand and correctly apply proper code syntax when attempting to instantiate a data structure type of interest.

Example methods, apparatus, systems, and articles of manufacture to select data structures are disclosed herein. Further examples and combinations thereof include the following:

Example 1 includes an apparatus to train a data structure selection model, the apparatus comprising an ordinal assigner to assign training code operations to respective first ordered values, and assign candidate data structure types to respective second ordered values, a filter generator to, for a first instruction of the training code operations, generate a Bloom filter bit vector pattern based on (a) one of the first ordered values, (b) one of the second ordered values corresponding to a first one of the candidate data structure types, and (c) a size of the first instruction, a label generator to generate a first model training input feature vector based on the Bloom filter bit vector pattern, data corresponding to the first instruction, and a performance metric of the first one of the candidate data structure types, and a neural network manager to train the data structure selection model with the first model training input feature vector.

Example 2 includes the apparatus as defined in example 1, wherein the filter generator is to apply a first hash function as an input to the Bloom filter for a first one of the candidate data structure types, and apply a second hash function as the input to the Bloom filter for a second one of the candidate data structure types.

Example 3 includes the apparatus as defined in example 1, wherein the filter generator is to apply a first hash function as an input to the Bloom filter when an operand corresponding to the first instruction satisfies a first threshold metric, and apply a second hash function as the input to the Bloom filter when the operand corresponding to the first instruction satisfies a second threshold metric.

Example 4 includes the apparatus as defined in example 1, further including a program parser to inspect an instruction associated with source code, the source code corresponding to real-world code and different from the training code, and determine whether the instruction includes a data structure agnostic application programming interface (API) placeholder.

Example 5 includes the apparatus as defined in example 4, further including an API information extractor to extract feature information from the data structure agnostic API.

Example 6 includes the apparatus as defined in example 5, wherein the filter generator is to generate an approximated bit vector based on (a) a source code operation, (b) a source code data structure size and (c) a first candidate data structure type.

Example 7 includes the apparatus as defined in example 6, further including an inference manager to apply the feature information and the approximated bit vector to the data structure selection model to generate a first cost estimate for the first candidate data structure type.

Example 8 includes the apparatus as defined in example 7, wherein the inference manager is to generate the first cost estimate by emulating the instruction associated with the source code rather than executing the instruction associated with the source code.

Example 9 includes the apparatus as defined in example 7, wherein the inference manager is to compare the first cost estimate for the first candidate data structure type to a second cost estimate for a second candidate data structure type corresponding to the instruction associated with the source code, and select one of the first or the second candidate data structure types based on the comparison.

Example 10 includes the apparatus as defined in example 1, wherein the neural network manager is to emulate the first instruction with a neural network.

Example 11 includes a non-transitory computer readable storage medium comprising instructions that, when executed by a processor, cause the processor to at least assign training code operations to respective first ordered values, assign candidate data structure types to respective second ordered values, generate, for a first instruction of the training code operations, a Bloom filter bit vector pattern based on (a) one of the first ordered values, (b) one of the second ordered values corresponding to a first one of the candidate data structure types, and (c) a size of the first instruction, generate a first model training input feature vector based on the Bloom filter bit vector pattern, data corresponding to the first instruction, and a performance metric of the first one of the candidate data structure types, and train the data structure selection model with the first model training input feature vector.

Example 12 includes the non-transitory computer readable storage medium as defined in example 11, wherein the instructions, when executed, cause the processor to apply a first hash function as an input to the Bloom filter for a first one of the candidate data structure types, and apply a second hash function as the input to the Bloom filter for a second one of the candidate data structure types.

Example 13 includes the non-transitory computer readable storage medium as defined in example 11, wherein the instructions, when executed, cause the processor to apply a first hash function as an input to the Bloom filter when an operand corresponding to the first instruction satisfies a first threshold metric, and apply a second hash function as the input to the Bloom filter when the operand corresponding to the first instruction satisfies a second threshold metric.

Example 14 includes the non-transitory computer readable storage medium as defined in example 11, wherein the instructions, when executed, cause the processor to inspect an instruction associated with source code, the source code corresponding to real-world code and different from the training code, and determine whether the instruction includes a data structure agnostic application programming interface (API) placeholder.

Example 15 includes the non-transitory computer readable storage medium as defined in example 14, wherein the instructions, when executed, cause the processor to extract feature information from the data structure agnostic API.

Example 16 includes the non-transitory computer readable storage medium as defined in example 15, wherein the instructions, when executed, cause the processor to generate an approximated bit vector based on (a) a source code operation, (b) a source code data structure size and (c) a first candidate data structure type.

Example 17 includes the non-transitory computer readable storage medium as defined in example 16, wherein the instructions, when executed, cause the processor to apply the feature information and the approximated bit vector to the data structure selection model to generate a first cost estimate for the first candidate data structure type.

Example 18 includes the non-transitory computer readable storage medium as defined in example 17, wherein the instructions, when executed, cause the processor to generate the first cost estimate by emulating the instruction associated with the source code rather than executing the instruction associated with the source code.

Example 19 includes the non-transitory computer readable storage medium as defined in example 17, wherein the instructions, when executed, cause the processor to compare the first cost estimate for the first candidate data structure type to a second cost estimate for a second candidate data structure type corresponding to the instruction associated with the source code, and select one of the first or the second candidate data structure types based on the comparison.

Example 20 includes the non-transitory computer readable storage medium as defined in example 11, wherein the instructions, when executed, cause the processor to emulate the first instruction with a neural network.

Example 21 includes a method to train a data structure selection model, the method comprising assigning training code operations to respective first ordered values, assigning candidate data structure types to respective second ordered values, generating, for a first instruction of the training code operations, a Bloom filter bit vector pattern based on (a) one of the first ordered values, (b) one of the second ordered values corresponding to a first one of the candidate data structure types, and (c) a size of the first instruction, generating a first model training input feature vector based on the Bloom filter bit vector pattern, data corresponding to the first instruction, and a performance metric of the first one of the candidate data structure types, and training the data structure selection model with the first model training input feature vector.

Example 22 includes the method as defined in example 21, further including applying a first hash function as an input to the Bloom filter for a first one of the candidate data structure types, and applying a second hash function as the input to the Bloom filter for a second one of the candidate data structure types.

Example 23 includes the method as defined in example 21, further including applying a first hash function as an input to the Bloom filter when an operand corresponding to the first instruction satisfies a first threshold metric, and applying a second hash function as the input to the Bloom filter when the operand corresponding to the first instruction satisfies a second threshold metric.

Example 24 includes the method as defined in example 21, further including inspecting an instruction associated with source code, the source code corresponding to real-world code and different from the training code, and determining whether the instruction includes a data structure agnostic application programming interface (API) placeholder.

Example 25 includes the method as defined in example 24, further including extracting feature information from the data structure agnostic API.

Example 26 includes the method as defined in example 25, further including generating an approximated bit vector based on (a) a source code operation, (b) a source code data structure size and (c) a first candidate data structure type.

Example 27 includes the method as defined in example 26, further including applying the feature information and the approximated bit vector to the data structure selection model to generate a first cost estimate for the first candidate data structure type.

Example 28 includes the method as defined in example 27, further including generating the first cost estimate by emulating the instruction associated with the source code rather than executing the instruction associated with the source code.

Example 29 includes the method as defined in example 27, further including comparing the first cost estimate for the first candidate data structure type to a second cost estimate for a second candidate data structure type corresponding to the instruction associated with the source code, and selecting one of the first or the second candidate data structure types based on the comparison.

Example 30 includes the method as defined in example 21, further including emulating the first instruction with a neural network.

Example 31 includes an apparatus to train a data structure selection model, the apparatus comprising means for assigning ordinals to assign training code operations to respective first ordered values, and assign candidate data structure types to respective second ordered values, means for filter generating to, for a first instruction of the training code operations, generate a Bloom filter bit vector pattern based on (a) one of the first ordered values, (b) one of the second ordered values corresponding to a first one of the candidate data structure types, and (c) a size of the first instruction, means for label generating to generate a first model training input feature vector based on the Bloom filter bit vector pattern, data corresponding to the first instruction, and a performance metric of the first one of the candidate data structure types, and means for neural network managing to train the data structure selection model with the first model training input feature vector.

Example 32 includes the apparatus as defined in example 31, wherein the filter generating means is to apply a first hash function as an input to the Bloom filter for a first one of the candidate data structure types, and apply a second hash function as the input to the Bloom filter for a second one of the candidate data structure types.

Example 33 includes the apparatus as defined in example 31, wherein the filter generating means is to apply a first hash function as an input to the Bloom filter when an operand corresponding to the first instruction satisfies a first threshold metric, and apply a second hash function as the input to the Bloom filter when the operand corresponding to the first instruction satisfies a second threshold metric.

Example 34 includes the apparatus as defined in example 31, further including means for program parsing to inspect an instruction associated with source code, the source code corresponding to real-world code and different from the training code, and determine whether the instruction includes a data structure agnostic application programming interface (API) placeholder.

Example 35 includes the apparatus as defined in example 34, further including means for extracting API information to extract feature information from the data structure agnostic API.

Example 36 includes the apparatus as defined in example 35, wherein the filter generating means is to generate an approximated bit vector based on (a) a source code operation, (b) a source code data structure size and (c) a first candidate data structure type.

Example 37 includes the apparatus as defined in example 36, further including means for managing inferences to apply the feature information and the approximated bit vector to the data structure selection model to generate a first cost estimate for the first candidate data structure type.

Example 38 includes the apparatus as defined in example 37, wherein the inference managing means is to generate the first cost estimate by emulating the instruction associated with the source code rather than executing the instruction associated with the source code.

Example 39 includes the apparatus as defined in example 37, wherein the inference managing means is to compare the first cost estimate for the first candidate data structure type to a second cost estimate for a second candidate data structure type corresponding to the instruction associated with the source code, and select one of the first or the second candidate data structure types based on the comparison.

Example 40 includes the apparatus as defined in example 31, wherein the neural network managing means is to emulate the first instruction with a neural network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to train a data structure selection model, the apparatus comprising:

ordinal assigner circuitry to:
assign training code operations to respective first ordered values, the ordinal assigner circuitry to cause the operations to be performed on a statistically distributed data set of data structure application programming interface (API) calls to the respective first ordered values; and
assign candidate data structure types to respective second ordered values;
filter generator circuitry to, for a first data structure API call of the training code operations, generate a Bloom filter bit vector pattern based on (a) one of the first ordered values corresponding to the first data structure API, (b) one of the second ordered values corresponding to a first one of the assigned candidate data structure types, and (c) a size of the first data structure API that represents a quantity of operations associated with modification of a data structure of the first one of the assigned candidate data structure types;
label generator circuitry to generate a first model training input feature vector based on the Bloom filter bit vector pattern, data corresponding to the first data structure API, and a performance metric of the first one of the candidate data structure types for the first data structure API; and
neural network manager circuitry to train the data structure selection model with the first model training input feature vector.

2. The apparatus as defined in claim 1, wherein the filter generator circuitry is to:
apply a first hash function as an input to the Bloom filter for a first one of the candidate data structure types; and
apply a second hash function as the input to the Bloom filter for a second one of the candidate data structure types.

3. The apparatus as defined in claim 1, wherein the filter generator circuitry is to:
apply a first hash function as an input to the Bloom filter when an operand corresponding to a first instruction satisfies a first threshold metric; and
apply a second hash function as the input to the Bloom filter when the operand corresponding to the first instruction satisfies a second threshold metric.

4. The apparatus as defined in claim 1, further including program parser circuitry to:
inspect an instruction associated with source code, the source code corresponding to real-world code and different from the training code; and
determine whether the instruction includes a data structure agnostic API placeholder.

5. The apparatus as defined in claim 4, further including API information extractor circuitry to extract feature information from the data structure agnostic API.

6. The apparatus as defined in claim 5, wherein the filter generator circuitry is to generate an approximated bit vector based on (a) a source code operation, (b) a source code data structure size and (c) a first candidate data structure type.

7. The apparatus as defined in claim 6, further including inference manager circuitry to apply the feature information and the approximated bit vector to the data structure selection model to generate a first cost estimate for the first candidate data structure type.

8. The apparatus as defined in claim 7, wherein the inference manager circuitry is to generate the first cost estimate by emulating the instruction associated with the source code rather than executing the instruction associated with the source code.

9. The apparatus as defined in claim 7, wherein the inference manager circuitry is to:
compare the first cost estimate for the first candidate data structure type to a second cost estimate for a second candidate data structure type corresponding to the instruction associated with the source code; and
select one of the first or the second candidate data structure types based on the comparison.

10. The apparatus as defined in claim 1, wherein the neural network manager circuitry is to emulate a first instruction with a neural network.

11. A non-transitory computer readable storage medium comprising instructions that, when executed by a processor, cause the processor to at least:
assign training code operations to respective first ordered values;
cause the training code operations to be performed on a statistically distributed data set of data structure application programming interface (API) calls to the respective first ordered values;
assign candidate data structure types to respective second ordered values;
generate, for a first data structure API call of the training code operations, a Bloom filter bit vector pattern based on (a) one of the first ordered values corresponding to the first data structure API, (b) one of the second ordered values corresponding to a first one of the assigned candidate data structure types, and (c) a size of the first data structure API that represents a quantity of operations associated with modification of a data structure of the first one of the assigned candidate data structure types;
generate a first model training input feature vector based on the Bloom filter bit vector pattern, data corresponding to the first data structure API, and a performance metric of the first one of the candidate data structure types for the first data structure API; and
train a data structure selection model with the first model training input feature vector.

12. The non-transitory computer readable storage medium as defined in claim 11, wherein the instructions, when executed, cause the processor to:
apply a first hash function as an input to the Bloom filter for a first one of the candidate data structure types; and
apply a second hash function as the input to the Bloom filter for a second one of the candidate data structure types.

13. The non-transitory computer readable storage medium as defined in claim 11, wherein the instructions, when executed, cause the processor to:
apply a first hash function as an input to the Bloom filter when an operand corresponding to a first instruction satisfies a first threshold metric; and
apply a second hash function as the input to the Bloom filter when the operand corresponding to the first instruction satisfies a second threshold metric.

14. The non-transitory computer readable storage medium as defined in claim 11, wherein the instructions, when executed, cause the processor to:
inspect an instruction associated with source code, the source code corresponding to real-world code and different from the training code; and
determine whether the instruction includes a data structure agnostic API placeholder.

15. The non-transitory computer readable storage medium as defined in claim 14, wherein the instructions, when executed, cause the processor to extract feature information from the data structure agnostic API.

16. The non-transitory computer readable storage medium as defined in claim 15, wherein the instructions, when executed, cause the processor to generate an approximated bit vector based on (a) a source code operation, (b) a source code data structure size and (c) a first candidate data structure type.

17. The non-transitory computer readable storage medium as defined in claim 16, wherein the instructions, when executed, cause the processor to apply the feature information and the approximated bit vector to the data structure selection model to generate a first cost estimate for the first candidate data structure type.

18. The non-transitory computer readable storage medium as defined in claim 17, wherein the instructions, when executed, cause the processor to generate the first cost estimate by emulating the instruction associated with the source code rather than executing the instruction associated with the source code.

19. The non-transitory computer readable storage medium as defined in claim 17, wherein the instructions, when executed, cause the processor to:
compare the first cost estimate for the first candidate data structure type to a second cost estimate for a second candidate data structure type corresponding to the instruction associated with the source code; and
select one of the first or the second candidate data structure types based on the comparison.

20. The non-transitory computer readable storage medium as defined in claim 11, wherein the instructions, when executed, cause the processor to emulate a first instruction with a neural network.

21. A method to train a data structure selection model, the method comprising:
assigning, by executing an instruction with processor circuitry, training code operations to respective first ordered values;
perform, by executing an instruction with the processor circuitry, the operations on a statistically distributed data set of data structure application programming interface (API) calls to the respective first ordered values;
assigning, by executing an instruction with the processor circuitry, candidate data structure types to respective second ordered values;
generating, by executing an instruction with the processor circuitry, for a first data structure API call of the training code operations, a Bloom filter bit vector pattern based on (a) one of the first ordered values corresponding to the first data structure API, (b) one of the second ordered values corresponding to a first one of the assigned candidate data structure types, and (c) a size of the first data structure API that represents a quantity of operations associated with modification of a data structure of the first one of the assigned candidate data structure types;
generating, by executing an instruction with the processor circuitry, a first model training input feature vector based on the Bloom filter bit vector pattern, data corresponding to the first data structure API, and a performance metric of the first one of the candidate data structure types; and
training, by executing an instruction with the processor circuitry, the data structure selection model with the first model training input feature vector.

22. The method as defined in claim 21, further including:
applying a first hash function as an input to the Bloom filter for a first one of the candidate data structure types; and
applying a second hash function as the input to the Bloom filter for a second one of the candidate data structure types.

23. An apparatus to train a data structure selection model, the apparatus comprising:
means for assigning ordinals to:
assign training code operations to respective first ordered values;
cause the operations to be performed on a statistically distributed data set of data structure application programming interface (API) calls to the respective first ordered values; and
assign candidate data structure types to respective second ordered values;
means for filter generating to, for a first data structure API call of the training code operations, generate a Bloom filter bit vector pattern based on (a) one of the first ordered values corresponding to the first data structure API, (b) one of the second ordered values corresponding to a first one of the assigned candidate data structure types, and (c) a size of the first data structure API that represents a quantity of operations associated with modification of a data structure of the first one of the assigned candidate data structure types;
means for label generating to generate a first model training input feature vector based on the Bloom filter bit vector pattern, data corresponding to the first data structure API, and a performance metric of the first one of the candidate data structure types for the first data structure API; and
means for neural network managing to train the data structure selection model with the first model training input feature vector.

24. The apparatus as defined in claim 23, wherein the filter generating means is to:
apply a first hash function as an input to the Bloom filter for a first one of the candidate data structure types; and
apply a second hash function as the input to the Bloom filter for a second one of the candidate data structure types.

25. The apparatus as defined in claim 23, wherein the filter generating means is to:
apply a first hash function as an input to the Bloom filter when an operand corresponding to a first instruction satisfies a first threshold metric; and
apply a second hash function as the input to the Bloom filter when the operand corresponding to a first instruction satisfies a second threshold metric.

* * * * *

UNITED STATES PATENT AND TRADEMARK OFFICE
CERTIFICATE OF CORRECTION

| | | |
|---|---|---|
| PATENT NO. | : 11,694,077 B2 | Page 1 of 1 |
| APPLICATION NO. | : 16/725911 | |
| DATED | : July 4, 2023 | |
| INVENTOR(S) | : Gottschlich | |

It is certified that error appears in the above-identified patent and that said Letters Patent is hereby corrected as shown below:

In the Drawings

Sheet 4 of 8 Figure "4", adjacent to "418", delete "EXECTUION" and insert --EXECUTION--.

Signed and Sealed this
Tenth Day of October, 2023

Katherine Kelly Vidal
*Director of the United States Patent and Trademark Office*